April 23, 1929.

R. H. CHILTON 1,709,828

SPRING SHACKLE

Filed Oct. 15, 1926

Inventor
Ralph H. Chilton
By Spencer Hardman & Fehr
Attorney

Patented Apr. 23, 1929.

1,709,828

UNITED STATES PATENT OFFICE.

RALPH H. CHILTON, OF DAYTON, OHIO, ASSIGNOR TO THE INLAND MANUFACTURING COMPANY, OF DAYTON, OHIO, A CORPORATION OF DELAWARE.

SPRING SHACKLE.

Application filed October 15, 1926. Serial No. 141,787.

This invention relates to flexible coupling members and has particular reference to flexible couplings adapted for use as spring shackles on vehicles.

An object of this invention is to provide an improved form of flexible coupling having the advantages of economy of manufacture and assembling in place upon the parts connected thereby, efficiency of operation, and long life.

An important feature of this invention is the relatively small amount of flexible rubber material used therein and a greater proportion of fabric and metal. This flexible rubber is placed only at the ends of the swinging element where distortion is necessary to permit the pivoting of the ends of the swinging element upon the parts connected thereby. The central portion of the swinging element contains no flexible rubber and is rendered rigid by reinforcing metal members so that it is capable of withstanding large compression forces without distortion. This coupling may therefore be used as a compression shackle in automobile spring suspension.

Further objects and advantages of the present invention will be apparent from the following description, reference being had to the accompanying drawings, wherein a preferred form of embodiment of the present invention is clearly shown.

In the drawings.

Similar reference characters refer to similar parts throughout the several views.

Figures 1, 2, 3:
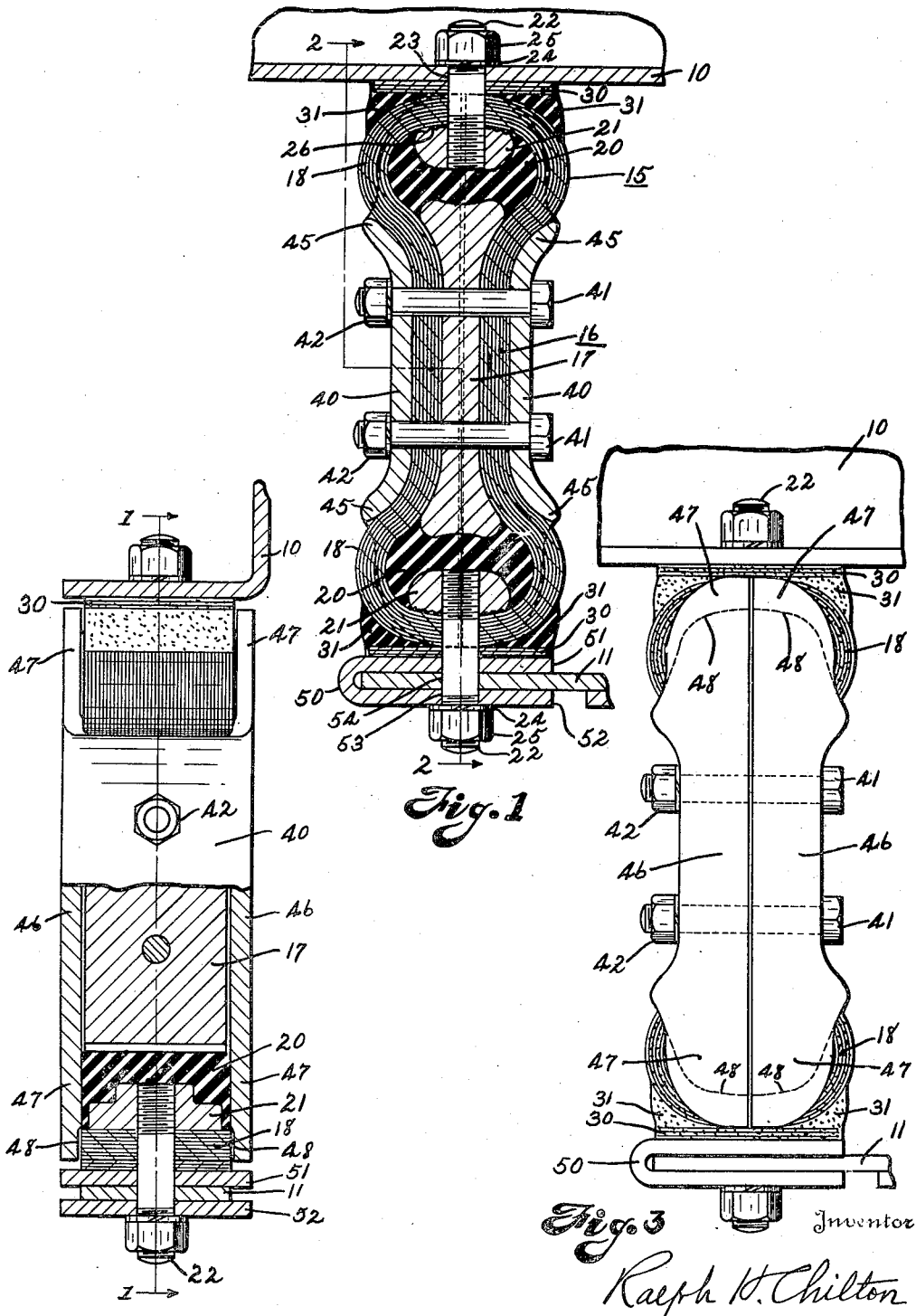
Fig. 1 illustrates a shackle built according to this invention mounted on the rear end of the front spring of an automobile. The vertical section is taken on line 1—1 of Fig. 2.
Fig. 2 is in part an end elevation and in part a sectional view taken on line 2—2 of Fig. 1.
Fig. 3 is a side elevation of Fig. 1.

Numerals 10 and 11 designate the two relatively movable parts connected by the shackle, 10 being the chassis frame side rail or a fitting rigidly connected thereto and 11 the projecting end of the longest leaf of the spring.

The molded unit, indicated as a whole by numeral 15, comprises an endless rubberized fabric band 16 which preferably is composed of a plurality of turns of rubberized cord fabric wrapped with the non-extensible cords thereof extending in a peripheral direction. A wide flat metal insert 17 is molded in place in the central portion and the fabric band 16 is shaped with the oval-shaped loops 18 at the ends of the metal insert 17, as clearly shown in Fig. 1. These loops 18 are filled with flexible rubber blocks 20 and the metal clamping inserts 21, which have the shanks 22 threaded or otherwise rigidly fixed thereto and projecting outwardly through the fabric band 16 as clearly illustrated. 30 are relatively stiff heavy fabric seats molded in place at the ends of the loops 18 and the wedge-shaped spaces between the seats 30 and the loops 18 are filled with the soft rubber cushions 31.

The parts so far described are all molded together in a suitable mold having means for holding the metal inserts properly in place, as will be clearly understood by those skilled in the art. The end loops 18 and the rubber material 20 and 31 are vulcanized to such a degree that after curing they are still quite flexible, while the fabric seats 30 are preferably cured to come from the mold relatively hard and stiff. Also these fabric seats 30 are preferably molded to have a concave form so that when they are firmly clamped against the flat metal surfaces 10 and 11 by the shanks 22 they will flatten out and hence hug the metal surfaces 10 and 51 more closely.

After removal from the mold, the molded unit 15 is provided with the two metal side clamps 40 and the through bolts 41 and nuts 42, which firmly clamp the central portions of the rubberized fabric band 16 and the metal insert 17 together to render the central portion of the swinging element very rigid and capable of sustaining large compression forces. Preferably the upper and lower edges of the side clamps 40 are flared outwardly at 45 adjacent the flexible oval loops 18, as clearly shown in Fig. 1, in order to provide a proper seat for the loops 18 when the swinging element is under compression.

The swinging element is connected to the flat under side of part 10 simply by inserting the shank 22 through the aperture 23 therein and applying the lock washer 24 and nut 25. When the nut 25 is screwed down tight the metal insert 21 clamps the upper end of loop 18 and fabric seat 30 very firmly to the under side of part 10. Preferably the clamping side of the metal insert 21 is convex and provided with small corrugations 26 to better clamp the fabric band in non-slipping relation to part 10. The lower end of the swinging element is similarly clamped to the projecting end of the spring leaf 11. In order to strengthen the pierced end of the leaf 11 and also to enable the swinging element to be of greater lateral width than said spring leaf if desired, the end of leaf 11 is provided with a metal fitting 50 having a seat plate 51 lying on top of leaf 11 and a clamping plate 52 lying therebelow. This fitting 50 is slipped over the end of leaf 11 until the holes 53 therein register with hole 54 in the leaf 11, after which the shank 22 is inserted and the clamping nut 25 applied, as described above. Thus the plates 51 and 52 are firmly clamped upon the end of leaf 11 and therefore greatly strengthen it where it is otherwise weakened by the hole 54.

The clamping plates 40 are preferably provided with the lateral flanges 46 which extend around the lateral sides of the swinging element and substantially house the central portion thereof. These flange 46 are shown as almost abutting each other on the central line (see Figs. 1 and 3) but slightly separated to indicate that the clamping pressure of bolts 41 is not limited by these flanges 46 coming into contact with each other. The upper and lower ends 47 of the flanges 46 project beyond the flared portions 45 thereof to give lateral support to the flexible loops 18 and the soft rubber blocks 20. These ends 47 will therefore minimize any lateral swinging of the swinging element 15 but will not hinder the desired longitudinal swinging of said swinging element to any appreciable extent. Since the portions of the flexible fabric loops 18 which are clamped under the inserts 21 must remain relatively stationary while the flange ends 47 swing with the swinging element 15, the inner surfaces of these flange ends are preferably cut away as shown at 48 where they overlap said stationary portions of the loops 18. By thus giving a very small clearance between the flange ends 47 and the relatively stationary portions of the fabric loop 18 any excessive rubbing of these parts together during the swinging of the swinging element 15 is avoided.

The wedge-shaped soft rubber blocks 31 serve to yieldably cushion the fabric loops 18 upon the relatively hard seats 30 and to prevent water, mud, gravel, etc., entering the space occupied by said blocks 31. If these wedge-shaped spaces were left unfilled mud, etc., would find lodgement therein in use and cause rapid deterioration of the flexible fabric 18.

While the form of embodiment of the present invention as herein disclosed, constitutes a preferred form, it is to be understood that other forms might be adopted, all coming within the scope of the claims which follow.

What is claimed is as follows:

1. In combination, an extension shackle connecting two relatively movable members, said shackle comprising a molded rubber unit having the opposite ends thereof fixed respectively to said movable members, said molded unit having a rigid metal insert molded in situ therein and extending throughout the central portion thereof and arranged to transmit the compression load imposed upon said molded unit.

2. In combination, an extension shackle connecting two relatively movable members, said shackle comprising a molded rubber unit having the opposite ends thereof fixed respectively to said movable members, said molded unit having a rigid metal insert therein extending throughout the central portion thereof and arranged to transmit the compression load imposed upon said molded unit, and a flexible rubberized fabric web extending substantially around the periphery of said molded unit.

3. In combination, a compression shackle connecting two relatively movable members, said shackle comprising a molded rubber unit having flexible end portions connected respectively to said members, and a relatively rigid central portion adapted to resist compression forces.

4. In combination, an extension shackle connecting two relatively movable members, said shackle comprising a molded rubber unit having flexible end portions connected respectively to said members, and a relatively rigid central portion adapted to resist compression forces, said central portion having a metal reinforcing member for increasing the rigidity thereof.

5. In combination, an extension shackle connecting two relatively movable members, said shackle comprising a swinging element having flexible end portions connected respectively to said members, said end portions comprising a loop of rubberized fabric enclosing a block of flexible rubber, and a metal reinforcing member for the central portion of said swinging member., 6. In combination, an extension shackle connecting two relatively movable members, said shackle comprising a swinging element having a relatively rigid central portion and flexible end portions connected respectively to said members, said end portions including a flexible rubberized fabric web and clamping means for fixing said web to said movable members whereby relative movement between said members is taken by distortion of said flexible web.

7. An extension shackle connecting two relatively movable members and having a swinging element comprising: an endless rubberized fabric band having a loop at each end thereof enclosing flexible rubber material, and metal reinforcing means for the central portion extending between said loops.

8. An extension shackle connecting two relatively movable members and having a swinging element comprising: an endless rubberized fabric band having a loop at each end thereof enclosing flexible rubber material, and metal reinforcing means for the central portion extending between said loops, and clamping means for securing the ends of said fabric loops to said movable members respectively.

9. An extension shackle connecting two relatively movable members and having a swinging element comprising: an endless rubberized fabric band having a loop at each end thereof enclosing flexible rubber material, said loops being secured to said two relatively movable members respectively, and means for clamping the two parts of said endless band together at the central portion of said swinging element.

10. An extension shackle connecting two relatively movable members and having a swinging element comprising an endless rubberized fabric band having a loop at each end thereof enclosing flexible rubber material, said loops being secured to said two relatively movable members respectively, and exterior metal members for clamping the two parts of said endless band together at the central portion of said swinging element.

11. An extension shackle connecting two relatively movable members and having a swinging element comprising: an endless rubberized fabric band having a loop at each end thereof enclosing flexible rubber material, said loops being secured to said two relatively movable members respectively, and exterior metal members for clamping the two parts of said endless band together at the central portion of said swinging element, and metal walls supporting the lateral sides of said end loops.

12. An extension shackle connecting two relatively movable members and having a molded rubber and fabric swinging element comprising: an endless rubberized fabric band molded substantially in the form of a dumbbell and having flexible rubber blocks contained within the end loops thereof, and exterior clamping members confining the neck portion of said molded element.

13. An extension shackle connecting two relatively movable members and having a molded rubber and fabric swinging element comprising: an endless rubberized fabric band molded substantially in the form of a dumbbell and having flexible rubber blocks contained within the end loops thereof, and exterior metal plates clamped against said fabric band at the neck portion of said molded element.

In testimony whereof I hereto affix my signature.

RALPH H. CHILTON.